United States Patent
Oguchi et al.

[15] 3,639,230
[45] *Feb. 1, 1972

[54] HYDRODESULFURIZATION OF HEAVY PETROLEUM HYDROCARBON OIL IN A FLUIDIZED REACTION ZONE

[72] Inventors: Yutaka Oguchi; Junichi Kubo, both of Tokyo, Japan

[73] Assignee: Yoshio Tomonaga President of Agency of Industrial Science and Technology, Tokyo, Japan

[ * ] Notice: The portion of the term of this patent subsequent to June 8, 1987, has been disclaimed.

[22] Filed: Mar. 25, 1969

[21] Appl. No.: 810,108

[30] Foreign Application Priority Data

Mar. 30, 1968   Japan..................................43/20415

[52] U.S. Cl..............................................208/213
[51] Int. Cl..............................................C10g 23/06
[58] Field of Search................208/213, 100, 101, 102, 103, 208/104, 105, 106, 107

[56] References Cited

UNITED STATES PATENTS

| | | | |
|---|---|---|---|
| 2,909,476 | 10/1959 | Hemminger | 208/213 |
| 2,968,614 | 1/1961 | Brooks et al. | 208/213 |
| 3,124,518 | 3/1964 | Guzman et al. | 208/213 |
| R25,770 | 4/1965 | Johanson | 208/213 |
| 2,917,451 | 12/1959 | Leffer | 208/107 |
| 3,408,286 | 10/1968 | Hepp | 208/105 |

*Primary Examiner*—Delbert E. Gantz
*Assistant Examiner*—G. J. Crasanakis
*Attorney*—Sherman and Shalloway

[57] ABSTRACT

A process for hydrodesulfurizing heavy petroleum hydrocarbon oil wherein the heavy oil and hydrogen-containing gas are heated to reaction temperature and introduced into a reactor containing a hydrodesulfurization catalyst and wherein the reaction mixture is introduced into a fluidization initiating zone. Fluidized mixture passes upward in a fluidized reaction zone where hydrodesulfurization of the oil is carried out; the mixture is separated in a separating zone from which liquid hydrodesulfurized product is withdrawn free of substantially all of said catalyst, and catalyst is allowed to settle in a catalyst settling zone. The reactor is designed so that (1) the sectional area of said separating zone is at least 1.1 times the sum of the sectional areas of said fluidized reaction zone and said catalyst settling zone and (2) the volume of said catalyst settling zone is smaller than the volume of said fluidized reaction zone.

6 Claims, 1 Drawing Figure

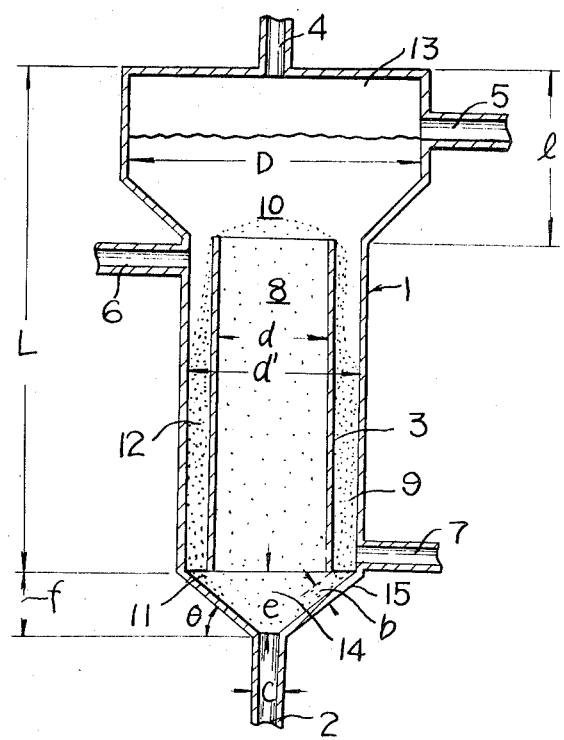

HYDRODESULFURIZATION OF HEAVY PETROLEUM HYDROCARBON OIL IN A FLUIDIZED REACTION ZONE

This invention relates to a process for conducting the hydrodesulfurization of hydrocarbon oil containing a substantial amount of sulfur.

The most desirable mode of hydrodesulfurization of heavy oil consists in effecting the contact at elevated temperatures and pressures of a suitable hydrodesulfurization catalyst with the feed stock heavy oil and a gas containing a substantial amount of hydrogen (hereinafter referred to as hydrogen-containing gas). As the hydrodesulfurization catalyst, as here referred to, useable are the sulfur-resistant catalysts such, for example, as the alumina or silica alumina-supported nickel-molybdenum catalyst, nickel-cobalt-molybdenum catalyst, cobalt-molybdenum catalyst and nickel-tungsten catalyst.

The mode of reaction for carrying out the hydrodesulfurization of heavy oil can be roughly classified into the fixed-bed, moving-bed and fluidized-bed techniques.

The catalyst used in the hydrodesulfurization of heavy oil tends to be rapidly contaminated by the carbonaceous sediments, various metallic components and other contaminants that are obtained in the feed stock. The regeneration of the catalyst which has been contaminated by these various metallic components or carbonaceous sediments is attended with difficulty, and the amount of the catalyst to be regenerated and its frequency are determined by the rate at which the contamination takes place.

The contamination of the catalyst becomes a problem especially in the case where the hydrodesulfurization is carried out in a fixed-bed reaction apparatus. In the fixed-bed reaction apparatus no substantial movement of the catalyst particles takes place in the reactor since they are fixed therein. The heavy oil and the hydrogen gas either rises or descends while making contact with the surface of the catalyst particles. On the other hand, where the hydrodesulfurization of heavy oil is carried out in a state where the catalyst has been fluidized, a substantial movement of the catalyst particles takes place and collision between the catalyst particles takes places repeatedly. As a result of this collision between the catalyst particles as well as collision with the wall of the reactor, the adhesion to the surface of the catalyst particles of the carbonaceous sediments, the various metallic components and the other contaminants is impeded, and hence the decline in the activity of the catalyst becomes less than in the case where the fixed-bed apparatus is employed.

When the activity of the catalyst in the reactor has declined on account of the aforesaid carbonaceous sediments, various metallic components and other contaminants, its activity is maintained by its regeneration. In the fixed-bed reaction apparatus it becomes necessary to interrupt the hydrodesulfurization operation for regenerating the catalyst. Further, in certain cases it becomes necessary to provide two or more reactors and to carry out the regeneration of the catalyst of one of the reactors while performing the hydrodesulfurization operation in the other reactor. The expense involved in such an operation is tremendous. Hence, numerous contrivances have been made with a view to prolonging the period of operation the hydrodesulfurization reaction in carrying out the hydrodesulfurization treatment of heavy oil. The most effective of these is the method of treatment of a fluidized catalyst. In accordance with this method, there is no need to interrupt the hydrodesulfurization operation for regenerating the catalyst.

Further, it is essential that a thorough contact of the catalyst, heavy oil and hydrogen is had in the reactor for ensuring the effective promotion of the hydrodesulfurization of the heavy oil. A more desirable contact of the foregoing components is achieved by fluidizing the catalyst particles in the reactor. Further, since the distribution of the temperature in the reactor becomes more uniform, the hydrodesulfurization treatment of heavy oil can be carried out under more favorable conditions.

However, even when the hydrodesulfurization treatment is carried out by a fluidized catalyst, a part or all of the catalyst must be replaced with a new or regenerated catalyst when the activity of the catalyst in the reactor has declined. And this replacement operation must be carried out without interruption of the operation. This replacement of the catalyst by replenishment with a catalyst of high activity and withdrawal of the catalyst whose activity has declined becomes an important problem from the technical and economic standpoint.

Further, in carrying out this replacement of the catalyst by replenishment and withdrawal of the catalysts, there was the tendency that the steady state of the inside of the reactor was disrupted to a certain extent in the case of the conventional apparatus which used the fluidized catalyst.

An object of the present invention is therefore to provide a process and apparatus for the hydrodesulfurization of heavy oil which makes possible the prolongation of the interval between replacement of the catalyst, consisting of replenishment with active catalyst and withdrawal of catalyst whose activity has declined, and in which this operation has been simplified, as well as in which the steady state inside the reactor is not disrupted even during the operation of replacing the catalyst, thus making it possible to continue the reaction effectively and steadily.

Further, when the object was to effect the hydrodesulfurization of the sulfur-containing hydrocarbon oil containing in a substantial amount the petroleum distillation residue generally referred to as heavy oil, there were cases in which the conversion of the foregoing sulfur-containing hydrocarbon oil by hydrocracking or thermal cracking to hydrocarbon oil containing light fractions was not desired. However, this side reaction cannot be completely checked even when the reaction is carried out using the conventional fluidized catalyst.

Another object of this invention is therefore to provide a process for hydrodesulfurizing heavy oil wherein the hydrocracking or thermal cracking of the sulfur-containing hydrocarbon oil is reduced to a minimum and only the desulfurization of the hydrocarbon oil is carried out selectively and effectively.

Further, the catalyst particles to be used in the hydrodesulfurization of heavy oil are preferably of small size as this means that the contact area is increased. However, when the size of the catalyst particles becomes small, there arises the difficulty, when used in the fluidized state, that the separation of the catalyst particles from the resulting desulfured oil and the hydrogen gas does not take place readily and, as a result, the contact of the catalyst with the oil over a prolonged period of time cannot be avoided. The contact of the oil and catalyst for a prolonged period of time results in an increase of the deposits on the catalyst of the aforementioned carbonaceous matter and metals, with the consequence that a decline in the activity of the catalyst is accelerated.

On the other hand, in order to avoid the foregoing drawback in the conventional method wherein a fluidized bed is used, it is necessary to raise the superficial velocity of the catalyst to at least a certain degree when using catalysts whose particle size is relatively coarse and, in consequence, there was the drawback that the amount of oil and gas cycled had to be increased. In fact, in a certain conventional method of conducting the hydrodesulfurization treatment, a part of the oil which has received the hydrodesulfurization treatment one is recycled to the lower part of the reactor, while the gas coming out of the reactor and containing hydrogen in a substantial amount is also recycled and used again. An increase in the amounts of this cycled oil and gas is not desirable, since such an increase brings about an increase in cost of constructing the respective cycling systems as well as their operation expenses. When the same reactor is used, the same desulfurization effects can be obtained with a lesser amount of the cycled oil and gas when using a smaller catalyst if the catalyst particles are of identical apparent specific gravity.

It is therefore a further object of the present invention to improve on the drawback of the conventional method and provide a process which makes possible the effective hydrodesulfurization of heavy oil not only when the catalyst used is that which is of a size usually used as a fluidized bed but also in the case where the catalyst used is of small particle size.

Again, in the hydrodesulfurization treatment of heavy oil by means of the fluidized catalyst, in general, the range of fluctuation in the amounts of the heavy oil and hydrogen-containing gas that can be introduced into the reactor in accordance with the change in the chemical composition of the heavy oil, i.e., the flexiblity of the reactor, should preferably be great. In the conventional apparatus for conducting the hydrodesulfurization of heavy oil by means of a fluidized catalyst, e.g., the apparatus disclosed in Japanese Pat. application publication No. 26105/1967, the height of the level (the upper boiling layer) of the fluidized catalyst, i.e., the volume of the reaction portion in which the hydrodesulfurication reaction essentially takes place, varies and, at times, the boil also is destroyed when the amounts of the heavy oil and the aforesaid hydrogen-containing gas varies. In consequence, the range of fluctuation in the amounts of the heavy oil and hydrogen-containing gas that can be introduced into the reactor is limited to a very narrow range.

A further object of the invention is therefore to provide a desulfurization process in which the volume of the reaction part does not vary as a result of a variation in the amounts of the heavy oil and hydrogen-containing gas that are introduced into the reactor and hence can be operated normally even though the heavy oil and hydrogen-containing gas introduced into the reactor are quantitatively of a very broad range.

On the other hand, there was also the drawback that in using the catalyst in the conventional processes by fluidizing it the superficial velocity of the oil and gas had to be raised to at least a certain degree. Further, in view of the fact that the inner wall of the reactor was in direct contact with the catalyst particles in a fluidized state and such corrosive compounds as sulfur and nitrogen were contained in the heavy oil, as well as contact was had with hydrogen at elevated temperatures and pressures, it was necessary to consider the matter of erosion and erosion-corrosion of the inner wall of the reactor at elevated temperatures and pressures. Hence, metals of high grade had to be used for preventing erosion and erosion-corrosion of the wall, thus inevitably resulting in the apparatus becoming costly.

Accordingly, a further object of this invention is to provide a process for conducting the hydrodesulfurization of heavy oil, which can solve this problem of erosion and erosion-corrosion of the reactor even when the reactor used is one which is not made of these high-grade materials, thus making it possible to use the reactor over a prolonged period of time without any trouble at all being caused by the erosion and corrosion mentioned above.

The process according to the present invention is characterized in that in conducting the hydrodesulfurization of heavy oil by contacting the same and hydrogen-containing gas with a hydrodesulfurization catalyst, this treatment is carried out by introducing the heavy oil and hydrogen-containing gas into a reactor containing said hydrodesulfurization gas, introducing the reaction system consisting of the heavy oil, hydrogen-containing and catalyst to a fluidization-initiating zone located in the reactor at its bottom to initiate the fluidization of the system, followed by causing this fluidized reaction system to proceed from the fluidization-initiating zone into a next adjoining fluidized reaction zone disposed in the aforesaid reactor above the former zone to effect the substantial hydrodesulfurization of the heavy oil while the fluidized reaction system proceeds upwardly through the fluidized reaction zone, and thereafter causing the effluent hydrodesulfurized product and the hydrogen-containing gas and catalyst from the fluidized reaction zone to dwell in a separating zone disposed inside said reactor next above the fluidized reaction zone to separate the hydrodesulfurized product, the catalyst and the hydrogen-containing gas from each other, the separated catalyst being then caused to settle to a catalyst-settling zone disposed inside said reactor externally of the aforesaid fluidized reaction zone to descend and arrive at the aforesaid fluidization-initiating zone, the upper part of which catalyst-settling zone communicating with said separating zone and the bottom part with the fluidization-initiating zone, the sum of the sectional area of said catalyst-settling zone and the sectional area of said fluidized reaction zone being substantially smaller than the sectional area of said separating zone and further the volume of said catalyst-settling zone being smaller than that of the fluidized reaction zone; and, on the other hand, withdrawing the hydrodesulfurized product and the hydrogen-containing gas from the aforesaid separating zone.

The process of the present invention can be readily and conveniently carried out by using the below-described apparatus; namely, a hydrodesulfurization reactor for heavy petroleum hydrocarbon oil, which comprises in combination, a feed inlet for the heavy oil and hydrogen-containing gas, a fluidization-initiating zone wherein the heavy oil and hydrogen-containing gas fed from said inlet are brought into contact with a hydrodesulfurization catalyst to initiate the fluidization of said catalyst, a fluidized reaction zone which while moving the aforesaid fluidized reaction system upwardly effects the hydrodesulfurization of the heavy oil, a separating zone wherein the effluent hydrodesulfurized product and catalyst from the fluidized reaction zone are caused to dwell and the hydrodesulfurized product, the catalyst and the hydrogen-containing gas are separated from each other, a hydrogen gas vent for discharging the separated hydrogen-containing gas, an outlet for withdrawing the separated hydrodesulfurized product from the separating zone, and a catalyst-settling zone for settling the catalyst separated in the separating zone; said fluidization initiating zone being provided with the feed inlet for the heavy oil and hydrogen-containing gas at its central bottom point, the bottom part of said zone being defined by the bottom of the reactor, which inclines centripetally and downwardly from the lower end of the peripheral wall of the reactor, said zone being in communication at its upper central part with the lower part of said fluidized reaction zone and at its upper circumferential part with the lower part of said catalyst-settling zone via an annular choked passage, said separating zone being in communication at its lower central part with the upper part of said fluidized reaction zone and at its lower circumferential part with the upper part of said catalyst-settling zone, and having a hydrogen-containing gas vent and a hydrodesulfurized product withdrawal outlet in its ceiling and upper sidewall, respectively, the periphery of said fluidized reaction zone being defined by an inner pipe disposed vertically inside the reactor coaxially therewith, said catalyst-settling zone being defined by the outer wall of the aforementioned inner pipe and the peripheral wall of the reactor, the volume of the catalyst-settling zone being smaller than that of the fluidized reaction zone, and further the separating zone being of greater diameter than the other zones in that its maximum sectional area is at least one and one-tenth times the sum of the sectional areas of the fluidized reaction zone and the catalyst-settling zone.

For a better understanding of the present invention reference is had to the accompanying drawing which is a schematic sectional view illustrating a reactor as used in this invention.

Referring to the drawing, the feed stock heavy oil and hydrogen-containing gas pass through a feed inlet 2 and enter via a fluidization initiating zone 14 into a fluidized reaction zone 8 surrounded by the inner wall of a pipe 3. At 8 the catalyst is maintained in a fluidized state. That the catalyst is in a fluidized state, as here referred to, is meant to be a state wherein a substantial movement of the catalyst takes place as a result of the movement of the feed stock oil, hydrogen-containing gas and the cycle oil. The catalyst is maintained in a fluidized state in the fluidized reaction zone 8. The rate of flow of the oil and hydrogen, when passing through 8, must be sufficient for maintaining the catalyst particles in a fluidized state, and it may be neither less than or greater than the terminal velocity of the catalyst particles. The superficial velocity of the oil and hydrogen-containing gas necessary for maintaining a fluidized state in the fluidized reaction zone 8 varies depending upon the average particle size and particle size distribution of the catalyst, as well as the proportion in which the oil and hydrogen are fed but, generally speaking, a range of 0.2 to 50 centimeters per second is preferred.

The catalyst particles rise in the fluidized reaction zone 8 while maintaining their fluidized state, but since the rate of flow of the oil and gas decreases in the separating zone 10 with an increase in the sectional area, the catalyst whose specific gravity is greater than that of the oil is separated downwardly. The catalyst particles which have settled in the separating zone 10 enter a catalyst settling zone 9 consisting of an annular passage formed by the inner wall 1 of the reactor and the outer wall of the inner pipe 3. The catalyst particles are packed more densely in the catalyst-settling zone than in the fluidized reaction zone 8. The catalyst in the zone 9 moved downwardly in a moving-bed state and is delivered to the fluidization-initiating zone 14 from the annular chocked passage 11. The catalyst is again fluidized here by means of the oil and gas and delivered into the fluidized reaction zone 8 to repeat its cycle. The oil and gas which are blown in from the inlet 2 at the bottom do not pass through the catalyst-settling zone 9 since their pressure loss when passing through 9 is greater than when passing through 8. Hence, the catalyst particles in the zone 9 are not fluidized.

It is preferred that the gas is in a fully dispersed state in the fluidized reaction zone 8. For this purpose, the lower part of the fluidized reaction zone is preferably provided with a rectifier such as the customarily used perforated plate or wire netting. The separating zone 10 is disposed above the fluidized reaction zone, and the separation of the catalyst particles, the oil and the gas is carried out in this zone. The gas-dwelling zone 13 is disposed above the separating zone 10. Accordingly, it is preferred that the oil be withdrawn from the separating zone 10, and the gas from the gas-dwelling zone 13.

The catalyst is charged or replenished via a catalyst-charging inlet 6 opening into the catalyst-settling zone 9 at a point thereabove, whereas the withdrawal of the catalyst is carried out by means of a catalyst withdrawal outlet 7 provided at the lower part of the zone 9 or from the lower part of the fluidization reaction zone 8.

The charging and replenishing of the catalyst and the withdrawal of the spent catalyst can either be carried out continuously or intermittently. Further, the charging and replenishing of the catalyst and the withdrawal of the spent catalyst can be carried out by the provision of a suitable number of inlets and outlets at suitable locations.

The catalyst used in the invention process may be those which per se are known as being hydrodesulfurization catalysts. For example, a catalyst comprising alumina or silica-alumina on which has been supported one or more of the metals of groups I, VI and VIII of the periodic table of elements can be used. As such a catalyst, included are the sulfur-resistant catalyst such as the alumina or silica-alumina-supported nickel-molybdenum catalyst, nickel-cobalt-molybdenum catalyst, cobalt-molybdenum catalyst and nickel-tungsten catalyst.

The ranges of properties and configuration of the catalyst particles used in the invention process are very extensive. Spheroidal catalyst of particle size ranging 0.1–20 mm. and extrusion molded type catalyst as well as other solid catalysts of any configuration can be used, but particularly effective are the fine spheroidal catalysts and extrusion molded type catalysts of a diameter not greater than 2 mm. Further, catalyst whose true specific gravity range is 1.20–7.00 and apparent specific gravity range is 0.10–1.50 can be used. This is because the separation of the oil, gas and catalyst in the separating zone 10 has been facilitated as a result of the great reduction of the superficial velocity of the oil and gas in the separating zone 10 as compared with that in the fluidized reaction zone; thus making it possible to use such catalysts which could not have been used in the conventional processes in which the separation of the oil, gas and catalyst was difficult. Generally speaking, in the hydrodesulfurization of oil, the treatment can be conducted more favorably, when the catalyst is used in a fluidized state, by cycling an oil which has been submitted at least once to the hydrodesulfurization process. However, if a catalyst of small particle size is used, the amount of oil flow necessary for effecting the fluidization of the catalyst particles can suffice with a smaller amount. Consequently, the process can be performed by cycling a lesser amount of the oil which has been submitted to the hydrodesulfurization process at least once, or it can be carried out without using such an oil at all. This is of a very great advantage from the economic standpoint.

Further, it is generally an advantage in the hydrodesulfurization treatment of heavy oil to reuse the unreacted hydrogen gas by recycling it to the reactor. In this case also the amount of the hydrogen-containing gas introduced into the reactor for maintaining the fluidized state of the catalyst particles, as well as carrying out the desired hydrodesulfurization treatment to obtain the intended product will suffice with a lesser amount when a catalyst of small particle size is used, hence contributing to a great decrease in the cost of construction and operation of the apparatus in the case of commercial scale operations.

An important feature of the present invention resides in the point that the sectional area of the separating zone has been made greater in that it is at least one and one-tenth times the sum of the sectional areas of the fluidized reaction zone and catalyst-settling zone and further that the volume of the catalyst-settling zone has been made smaller than that of the fluidized reaction zone. In our copending application Ser. No. 737,733, which issued as U.S. Pat. No. 3,583,905, on June 8, 1971, we proposed a process of conducting the hydrodesulfurization of heavy oil in a reaction vessel, of dual-barreled construction consisting of a fluidization initiating zone, a fluidized reaction zone, a catalyst separation zone and a catalyst-settling zone. While this process was satisfactory with respect to the point that the hydrodesulfurization of heavy oil could be carried out while maintaining the superficial velocity of the heavy oil and gas at a relatively low level, there was however a tendency that the separation of the catalyst and the hydrodesulfurized product was not always accomplished with ease when the rate of flow of the heavy oil was increased.

The properties of heavy oil varies greatly depending upon its locale of production as well as its period of production though of the same locality. Hence, the hydrodesulfurization plant for heavy oil should preferably possess considerable flexibility as regards its operation conditions, especially the rate of flow of the heavy oil.

According to the present invention, since the catalyst, oil and gas from the fluidized reaction zone are conducted into a separating zone having a sectional area of a specified size, as hereinbefore noted, the separation of the catalyst particles from the oil and gas is readily accomplished even when the rate of flow of the oil is relatively great. Furthermore, there is the advantage that in this case by making the sectional area of the catalyst-settling zone smaller than that of the fluidized reaction zone the hydrodesulfurization of the heavy oil can be carried out more effectively.

When the hydrodesulfurization of heavy oil is carried by means of the invention process, the hydrodesulfurization reaction essentially takes place in the fluidized reaction zone and substantially no reaction takes place in the catalyst-settling zone. Thus, an increase in the volume of the catalyst-settling zone is of no use but merely results in enlarging the volume of this reactor. Aside from the fact that there accrues no economic or technical advantage by such an increase in the volume of the reactor, this means an increase in the cost of constructing the reactor.

Further, although the heavy oil is present in the interstices of the catalyst particles that are in a packed state in the catalyst-settling zone, the hydrogen gas does not pass through this part. Consequently, the possibility of the occurrence of catalytic and thermal cracking of the heavy oil is greater in the catalyst-settling zone than in the fluidized reaction zone. Further, as a result of the occurrence of catalytic and thermal cracking of the heavy oil, the catalyst becomes contaminated with carbonaceous sediments and other matter to result in a decline in its activity. Hence, when it is contemplated to carry out the hydrodesulfurization of heavy oil while checking the catalytic and thermal cracking of the heavy oil, the reduction in the volume of the catalyst-settling zone is very effective for the following reasons: (1) the fact that the amount of heavy oil dwelling in the catalyst-settling zone is reduced, and (2) the fact that the amount of catalyst dwelling in the catalyst-settling zone is lowered.

In practicing the process of the present invention, the fluidization reaction zone 8 is most desirably of cylindrical shape and the several cross sections of the reactor are also most preferably circular. In this case, the separating zone 10 is of either cylindrical or inverted conical shape and of a diameter greater than that of the annular catalyst-settling zone 9. From the standpoint of carrying out the separation of the catalyst particles from the oil and gas smoothly, the separating zone 10 is preferably of inverted conical shape with its outer lower end joined to the outer upper end of the catalyst-settling zone 9. This inverted cone may, of course, be joined at its upper end with the lower end of a cylinder to form as a whole a separating zone. In this case, for maintaining the catalyst particles in a fluidized state, the superficial velocity of the oil passing through the fluidized reaction zone 8 must be at least a certain level and furthermore the superficial velocity of the hydrogen-containing gas must also be at least a certain level for accomplishing the desired hydrodesulfurization treatment. In order to maintain the catalyst particles having the previously indicated properties and configuration in a fluidized state in the fluidized reaction zone and effect their prompt separation from the oil and gas it is preferred that the following relationships hold between the dimensions of several zones.

Namely, between the maximum diameter $D$ of the separating zone 10 and the inside diameter $d'$ of the peripheral wall of the catalyst-settling zone the following relationship should hold.

(1) $\quad 1.1 < (D/d')^2 < 16$

Further, between the foregoing $d'$ and the diameter (inside diameter of the inner pipe 3) $d$ of the peripheral wall of the fluidized reaction zone it is preferred that the following relationship should hold.

(2) $\quad 1.01 \leq d'/d \leq 1.414$

The catalyst which has descended into the catalyst-settling zone moves into the fluidization initiating zone 14 after passing via a narrow opening, i.e., an annular choked passage 11, between the inner pipe and the outer casing at the lower end of the reactor. For the effective accomplishment of this movement, the distance $b$ of the narrow opening should preferably be one two-hundreths to one-fifth of the inside diameter $D$ of the outer casing.

$D/200 \leq b \leq D/5$

In addition, the lower part 15 of the outer casing must be inclined. This lower part 15 may be either straight or curved, but when it is curved, its radius of curvature $R$ should preferably be greater than $D/4$.

(4) $\quad R > D/4$

In addition, it is preferred that when the inclined surface 15 is straight, its inclination $\theta$, or when the inclined surface is curved, the inclination $\theta$ of a tangent line drawn at its lowest point satisfies the following relationship:

(5) $\quad 10° < \theta < 80°$

The configuration of the fluidized reaction zone can be freely chosen, but it is preferred that the relationship between its inside diameter $d$ and its length $L-l$ satisfies the following relationship:

(6) $\quad 1.2 < L-l/d < 50$

In the reactor used in the present invention the catalyst in a fluidized state makes contact with the heavy oil and the hydrogen-containing gas in the fluidized reaction zone 8. Hence, of the elements making up the reactor the inner pipe 3 is the only one requiring consideration as being subjected to the harsh erosive and corrosive conditions involved. However, since the inner and outer surfaces of the inner pipe 3 is subjected to an equal pressure, its thickness may be thinner than that of the outer casing. Hence, it is less costly than the outer casing, thus making exchange of the inner pipe alone a simple matter economically.

The invention process may be carried out using two or more of the hereinbefore described reactors connected in series or parallel. Again, it is also possible to achieve the desired objective by disposing two or more of the inner pipes in a single outer casing.

The reaction conditions employed differ depending upon the properties of the feed stock oil, and the properties desired in the product. Generally speaking, the heavy oil and hydrogen-containing gas are contacted with the hydrodesulfurization catalyst inside the reactor at a temperature of 200° to 500° C., preferably 300° to 450° C., and a pressure of 10 to 400 kg./cm.$^2$ gauge, preferably 100 to 300 kg./cm.$^2$ gauge. In this case it is preferred to maintain the liquid hourly space velocity (LHSV) of the heavy oil at 0.2 to 5.0 vol./vol./hr., preferably 0.5 to 3.0 vol./vol./hr., and the ratio of the flow rates of hydrogen to feed stock oil at 50 to 1,000 $l$-NTP/$l$ of feed stock oil.

The hydrodesulfurized oil which has left the reactor is submitted to either steam stripping, reduced pressure steam stripping, or reduced or normal pressure distillation, or a combination of these treatments to remove the dissolved gas and separate the low-boiling components such as cracked light oils.

The advantages to be had by practicing the present invention can be summarized as follows:

(1) The operation can be carried out normally even when the amounts of the heavy oil and hydrogen-containing gas introduced into the reactor are varied over a broad range, i.e., the flexibility of the reactor has been increased.
(2) The separation of the catalyst particles from the oil and gas is readily accomplished even range of configuration and size are used, including spheroidal catalysts of particle diameter 0.1–20 mm. and extrusion molded catalysts as well as other catalysts of all types of configuration, whose true and apparent specific gravities range 1.20–7.00 and 0.10–1.50, respectively, and in addition, even when the rate of flow of the oil has been increased.
(3 Fine catalyst particles can be used, thus making it possible to reduce the amount cycled of the oil and gas for fluidizing the catalyst particles. Hence, it is economically advantageous.
(4) In the reactor used in the present invention the part requiring pressure-resistant strength is not liable to erosive and erosive-corrosive actions, and, on the other hand, that part which is subjected to harsh conditions of erosion and erosion-corrosion does not require pressure-resistant strength. Thus, since the latter part alone can be replaced, it is economical.
(5). The separation of the catalyst has been facilitated by having made the sectional area of the separating zone substantially greater than the sum of the sectional areas of the fluidized reaction zone and the catalyst-settling zone. In addition, as a consequence of having reduced the volume of the catalyst-settling zone, the amounts of oil and catalyst dwelling in the catalyst-settling zone have been reduced, thereby checking the catalytic and thermal cracking of the heavy oil, and not only accelerating to hydrodesulfurization of the heavy oil but also preventing the decline in the activity of the catalyst as a result of the catalyst being contaminated by such as the carbonaceous sediments.

For a better understanding of the invention the following illustrative examples are given.

Example I

A reactor as shown in the accompanying FIG. 1 and having the dimensions indicated in table I was employed, and the hydrodesulfurization reaction was carried out in this reactor with the feed stock oil, catalyst and reaction conditions indicated in said table I, with the consequence that a product having the properties indicated therein was obtained. The separation of the catalyst particles from the oil and hydrogen-containing gas was fully satisfactory. Further, although the replacement of the catalyst was carried out at intervals of about 20 hours while containing the operation, no change in either the operating conditions or the properties of the product was noted.

Table I

| Properties of oil | Feed stock oil | Product |
| --- | --- | --- |
| Class of feed stock | Khurusanya oil normal pressure distillation residue | |
| Total sulfur (wt. %) | 3.97 | 0.41 |
| Desulfurization rate (%) | | 77.2 |
| Residual carbon (wt. %) | 9.8 | 8.0 |
| Yield based on feed stock (wt. %) | | 95.9 |
| Viscosity (c.st 50° C.) | 351.3 | 272.1 |
| Catalyst | | |
| Class of catalyst | silica-alumina-supported Ni-Mo catalyst | |
| Configuration of particles | 0.4 mm. spheroid | |
| True specific gravity | 4.1 | |
| Reaction Conditions | | |
| Temperature | 400° C. | |
| Pressure | 220 kg./cm.² a. | |
| LHSV l./hr.) | 1.0 | |
| Continuous operation time | 132 hr. | |
| Amount of oil cycled | 6.1 (m.³)/feed oil (m.³) | |
| Amount of hydrogen cycled | 920 m.³/feed oil (m.³)(NTP) | |
| Dimensions of Reactor | | |
| D | 16 cm | |
| d | 8 cm | |
| d' | 10 cm | |
| L | 200 cm | |
| f | 15 cm | |

EXAMPLES II and III

A reactor of the type illustrated in FIG. 1 and having the dimensions indicated in table II was employed, and the hydrodesulfurization treatment was carried out on the feed stock indicated in said table using the catalyst and reaction conditions set forth therein. The results obtained are shown in table II.

It can be seen from the foregoing results that even when the amount fed (amount cycled) of the oil is increased, the results obtained by the invention process demonstrates a performance equally satisfactory as that of the case where the amount of oil fed is small.

Further, the velocity of the fluidized reaction zone reached as high as 4.7 centimeters per second under the conditions employed in example III, but even in this case there was substantially no discharge of the catalyst particles to the outside of the system.

Again, when, by way of comparison, the hydrodesulfurization experiment was carried out under identical conditions as in example III using a reactor of identical dimensions as that indicated in table II except that the maximum diameter D of the separating zone was 23 centimeters, a value equal to the diameter d' of the peripheral wall of the catalyst-settling zone, the reaction could not be operated smoothly, since either a substantial amount of the catalyst particles was discharged externally of the system or their descent did not take place satisfactorily.

TABLE II

|  | Example 1 | | Example 2 | |
| --- | --- | --- | --- | --- |
|  | Feed stock oil | Product | Feed stock oil | Product |
| Properties of oil: | | | | |
| Class of feed stock | (¹) | | (¹) | |
| Total sulfur, wt. percent | 4.25 | 0.72 | 4.25 | 0.75 |
| Desulfurization rate, percent | | 83.0 | | 82.5 |
| Residual carbon, wt. percent | 13.0 | 10.8 | 13.0 | 10.1 |
| Yield based on feed stock | | 97 | | 97.2 |
| Viscosity, cst. at 50° C. | 1,120 | 187 | 1,120 | 236 |
| Catalyst: | | | | |
| Class of catalyst | (²) | | (²) | |
| Configuration of particles, mm. spheroid | 0.2 | | 0.2 | |
| True specific gravity | 3.6 | | 3.6 | |
| Reaction conditions: | | | | |
| Temperature, °C | 380 | | 380 | |
| Pressure, kg./cm.²a | 190 | | 190 | |
| LHSV, 1./hr | 1.1 | | 1.1 | |
| Continuous operation time, hr | 260 | | 260 | |
| Amount of oil cycled, (m.³)/feed oil (m.³) | 4 | | 40 | |
| Amount of hydrogen cycled, m.³/feed oil (m.³) | 400 | | 1,200 | |
| Dimensions of reactor, cm.: | | | | |
| D | 40 | | 40 | |
| d | 20 | | 20 | |
| d' | 23 | | 23 | |
| L | 400 | | 400 | |
| f | 34 | | 34 | |
| l | 40 | | 40 | |

¹ Khafji oil normal pressure distillation residue.
² Silica-alumina supported Co-Mo type catalyst.

We claim:
1. A process for the hydrodesulfurization of a heavy petroleum hydrocarbon oil which comprises
   a. introducing said heavy oil and a hydrogen-containing gas heated to the reaction temperature into a reactor containing a hydrodesulfurization catalyst,
   b. introducing the resulting reaction mixture consisting of said heavy oil, hydrogen-containing gas and catalyst into a fluidization-initiating zone located in said reactor at the bottom thereof so as to initiate the fluidization of said catalyst,
   c. passing the resulting fluidized mixture of catalyst oil and gas from said fluidization-initiating zone into a next adjoining fluidized reaction zone disposed in said reactor above said fluidization-initiating zone, the hydrodesulfurization of said heavy oil being substantially carried out during upward movement through said fluidized reaction zone,
   d. allowing effluent hydrodesulfurization product and catalyst flowing out from said fluidized reaction zone to dwell in a separating zone disposed inside said reactor immediately above said fluidized reaction zone, so as to separate said hydrodesulfurized product, said catalyst and said hydrogen-containing gas from each other,
   e. withdrawing liquid hydrodesulfurized product from said separating zone free of substantially all of said catalyst,
   f. allowing said catalyst separated in said separating zone to settle in a catalyst-settling zone disposed inside said reactor externally of said fluidized reaction zone, the upper portion of said catalyst-settling zone communicating with said separating zone, the bottom portion of said settling zone communicating with said fluidization-initiating zone, and
   g. returning the catalyst from said settling zone to said fluidization zone to repeat steps (a) through (f); said reactor being designed such that the sectional area of said separating zone is at least one and one-tenth times the sum of the sectional areas of said fluidized reaction zone and said catalyst-settling zone and the volume of said catalyst-settling zone is smaller than the volume of said fluidized reaction zone.

2. The process of claim 1 wherein the superficial velocity of said heavy oil and hydrogen-containing gas in said fluidized reaction zone is maintained in the range from 0.2 to 50 centimeters per second.

3. The process of claim 1 wherein said catalyst is a solid catalyst whose particle diameter is 0.1–20 mm., true specific gravity is 1.20–7.00 and apparent specific gravity is 0.10–1.50

4. The process of claim 1 wherein the temperature of said fluidized reaction zone is maintained at 200° to 500° C., and the pressure at 10 to 400 kg./cm.$^2$ gauge.

5. The process of claim 1 wherein said heavy oil is fed at a liquid hourly space velocity in the range from 0.2 to 5.0 vol./vol./hr.

6. The process of claim 1 wherein the ratio of feed of the hydrogen to the feed stock oil is maintained at 50 to 1000 $l$–NTP/of feed stock oil.

* * * * *

UNITED STATES PATENT OFFICE
CERTIFICATE OF CORRECTION

Patent No. 3,639,230    Dated February 1, 1972

Inventor(s) OGUCHI ET AL

It is certified that error appears in the above-identified patent and that said Letters Patent are hereby corrected as shown below:

Col. 9, in Table I, line 25 under the Heading Properties of oil, after "c.st." insert -- ⊚ -- .

Col. 9, in Table I, line 36 under the heading Properties of oil, after "LHSV" insert -- ( --.

Col. 10, in Table II, line 13 under the subheading Properties of oil, after "c", insert -- . -- .

Col. 12, Claim 6, line 6, after "-NTP/", insert -- $\ell$ --.

Signed and sealed this 4th day of July 1972.

(SEAL)
Attest:

EDWARD M. FLETCHER, JR.
Attesting Officer

ROBERT GOTTSCHALK
Commissioner of Patents